US006038602A

United States Patent [19]
Ishikawa

[11] Patent Number: 6,038,602
[45] Date of Patent: Mar. 14, 2000

[54] CONNECTION METHOD FOR A NETWORK SYSTEM AND A SERVER COMPUTER

[75] Inventor: Katsuya Ishikawa, Zama, Japan

[73] Assignee: International Business Machines Corporation, Armonk, N.Y.

[21] Appl. No.: 08/848,360

[22] Filed: Apr. 30, 1997

[30] Foreign Application Priority Data

Jun. 14, 1996 [JP] Japan ................................. 8-153730

[51] Int. Cl.$^7$ ........................................ G06F 13/00
[52] U.S. Cl. .............................. 709/227; 709/204
[58] Field of Search ....................... 370/260, 261, 370/352; 379/202, 204, 205, 93.21; 395/200.34, 200.57, 200.58, 200.79; 709/204, 207, 227

[56] References Cited

U.S. PATENT DOCUMENTS

| | | | |
|---|---|---|---|
| 5,572,582 | 11/1996 | Riddle ...................................... | 379/202 |
| 5,586,257 | 12/1996 | Perlman .................................. | 709/228 |
| 5,623,488 | 4/1997 | Svennevik et al. .................. | 370/261 X |
| 5,674,003 | 10/1997 | Andersen et al. ..................... | 709/228 |
| 5,737,333 | 4/1998 | Civanlar et al. ......................... | 370/352 |
| 5,742,670 | 4/1998 | Bennett ................................. | 709/204 |
| 5,764,916 | 6/1998 | Busey et al. ............................ | 709/227 |
| 5,768,513 | 6/1998 | Kuthyar et al. ......................... | 709/204 |
| 5,777,989 | 7/1998 | McGarvey ............................... | 709/249 |

OTHER PUBLICATIONS

Jim M. Ng et al., A Distributed Multimedia Conferencing System, Proceedings IEEE Tencon '93, Oct. 1993, pp. 57–60.

Anna Hac et al., Architecture and Implementation of a Multimedia Conference System, Proceedings Emerging Technologies and Applications in Communications, May 1996, pp. 50–53.

Stephen Somogyi, Internet Telephony programs, MacUser, Ziff–Davis Publishing, Jan. 1997, vol. 13 No. 1, pp. 44–45.

Mark Moordian, Online game networks revived by the web, Interactive Content, Jupiter Communication, Jun. 1996, vol. 2 No. 26, pp. 6–10.

*Primary Examiner*—Zarni Maung
*Assistant Examiner*—Patrice Winder
*Attorney, Agent, or Firm*—Douglas W. Cameron; Anne Vachon Dougherty

[57] ABSTRACT

A server and method for connecting in a network system whereby user computers can be connected with each other as clients of server computers using Internet Protocol (IP) connections. When Internet user A desires to talk with user B across the Internet, user A dials up server A for an IP connection and issues a request to server A for connection with user B. Upon receipt of a request for connection to a user B, server A accesses a record for user B. which record is stored in a storage area managed by server A. The record includes a user name, corresponding server name, user phone number, and IP connection state of the user. Once this record has been accessed, server A sends a connection request to server B. Since servers A and B are constantly connected, server B can respond immediately to a request from server A. Server B examines the pertinent record in its storage area and determines whether or not user B currently has an IP connection. If user B does not currently have an IP connection, then server B dials up user B to establish the IP connection. Once an IP connection for user B is established, server B notifies server A and server A notifier user A that an IP connection to user B has been completed. For users A and B, the IP connection is transparent such that they share the use of an application and are enabled to talk across the Internet.

6 Claims, 8 Drawing Sheets

CONNECTION METHOD FOR A NETWORK SYSTEM AND A SERVER COMPUTER

DESCRIPTION

TECHNICAL FIELD

The present invention relates to a connection method for a network system whereby user computers can be connected with each other as clients of server computers, and to a server computer; and in particular, to a connection method for a network system for connecting user computers that can be connected to the Internet using IP (Internet Protocol) connections, and to a server computer. More specifically, the present invention pertains to a connection method for a network system whereby is provided a connection type of the Internet videophone that is convenient for common Internet users, and a server computer therefor.

BACKGROUND OF THE INVENTION

A "telecomputing system" that connects computers at remote areas together by using telephone lines has been developed. In Japan, for example, personal computer communication has been popular since the telecommunication service law became effective in 1985.

Trends in personal computer communication: The primary recent trends in personal computer communication are to increase communication speeds and mutual connections (gateway service), and to employ the Internet.

The Internet originated as an international communication network linking together universities and research institutes in 54 nations worldwide for the exchange of academic study data, and since the 1970's its development has been supported by an agency of the U.S. Government. Servers (mainly UNIX workstations) installed at universities and research institutions are voluntarily mutually linked, and together have formed a huge worldwide network. The present Internet is made up of in excess of several hundred thousand servers worldwide. Remote server computers are mutually linked using TCP/IP (Transmission Control Protocol/Internet Protocol), and can exchange data and communicate with each other via an electronic bulletin board (BBS: Bulletin Board System).

Conventionally, the Internet carried images that only linked Unix-based computers could utilize, but in 1994 it became available for general public use, so that even personal computer communication services in Japan can now access the Internet. The Internet is attracting ordinary users because it can be used to access information at overseas locations at a relatively low price, and because it has an advanced user interface using an image display.

Functions of the Internet:

The Internet has the following primary functions:

(1) Electric mail (E-mail)

(2) Remote control (telenet)

(3) File search/transfer (FTP: file transfer protocol)

(4) Electronic bulletin board (Usenet)

The electronic bulletin board, as a system, is the same as a BBS for personal computer communication, and is used to send messages or to provide information to a single person or to an unspecified number of people. When an inquiry concerning an interesting subject, for example, is posted on a BBS, the receipt of many responses from unknown persons can be expected. BBSs using the Internet especially enable the exchange of news and the holding of discussions on a global basis, and collectively are sometimes called the world's largest "bulletin board". A teleconference system, that has frequently been referred to, was developed from the BBS system. The teleconference system provides an improved search function based on the presenters' name and a message display function.

Access to the Internet: The Internet is not a single computer network controlled by a specific company or organization, but substantially is a community of networks of computers (server computers) storing information.

Before a user uses the Internet, his or her personal computer must be linked as a client to a subscribed server computer. If a user is a researcher or a student, he or she can access as a client a server at a university or an institution. On the other hand, ordinary users must execute a contract with a commercial Internet service company (hereinafter referred to as an "Internet provider" or a "service provider") that provides servers for clients. Such a service provider is, for example, the "IBM Internet Connection Service" from IBM Japan, Co., Ltd. or the "BEKKOAME/INTERNET" from Bekkoame Internet.

Among the several types of contracts offered by service providers, a "dial-up IP (Internet Protocol) connection" (hereinafter simply referred to as an "IP connection") is readily employed for personal use. With an IP connection, the PC of a user can be connected as a client to the server computer of a service provider by using a telephone line and a modem, and can thereafter access another server on the Internet via the provider's server computer.

Since server computers are always linked together on worldwide basis, the use of the Internet is free, whereas an access fee is generally charged by a service provider.

Recently, the Internet has ceased to be limited in its use to being an information transmission means, such as is represented by an e-mail or FTP accesses, and tends now to also be used as a real-time information communication means for the transmission of audio/video information. The expansion in the uses of the Internet stems from the Internet's high performance and its excellence as a communication medium. The Internet provides high performance because it includes an advanced user interface using an image display. And its excellence as a communication medium becomes obvious when the charges for the services it provides are considered. Since the server computers are constantly linked together on worldwide basis, the same charge rate applies to both domestic communication and international communication. To access information available at a remote area, substantially, no international telephone fee is required, the only telephone fee being that which is assessed for connection to the nearest access point (AP) of a contracted provider. And in addition, the Internet can be employed as a videophone (hereinafter referred to as an "Internet videophone").

The greatest barrier to the use of Internet videophones by ordinary users is the connection method that the current service providers provide. When, for example, ordinary user A desires to access ordinary user B, user A must naturally call a service provider to obtain an IP connection. At this time, however, user B must also call a service provider to preliminarily obtain an IP connection, and must then wait until an access is initiated by user A. User B, however, can not always wait for an access with maintaining the IP connection, because he or she may be charged an enormous service fee by his or her service provider. Thus, before an Internet videophone is used, a caller and a caller must adjust their schedules in advance. This, however, renders using a videophone as a daily communication means very inconvenient because users must agree in advance on an access time in order to make a call.

SUMMARY OF THE INVENTION

It is, therefore, one object of the present invention to provide a protocol for an excellent service provider that includes a type of connection to an Internet videophone convenient for Internet users.

It is another object of the present invention to provide a protocol for an excellent service provider that has a connection type for an Internet videophone with which a user can make a connection in the same manner as is possible with a public telephone.

It is an additional object of the present invention to provide an excellent connection method for a network system to connect a user computer that can access a network as a client of a server computer, and an excellent server computer that implements the excellent connection method.

It is a further object of the present invention to provide an excellent connection method for a network to connect user computers that can be connected to the Internet using an IP connection, and a server computer that implements the excellent connection method.

SUMMARY OF THE INVENTION

To achieve the above objects, according to a first aspect of the present invention, a connection method, for a network system that encompasses the Internet, a plurality of user computers, and a plurality of server computers, the server computers being constantly interconnected to provide the user computers an IP connection service for the Internet, comprises the steps of: (a) a first user computer making a dial-up IP connection to a first server computer, (b) the first user computer sending, to the first server computer, a connection request along with ID information for a second user computer; (c) the first server computer, in accordance with the received ID information, locating a second server computer in whose territory the second user computer resides; (d) the first server computer notifying the second server computer of the connection request; (e) the second server computer, in response to the connection request, making a dial-up IP connection to the second user computer; (f) the second server computer notifying the first user computer, via the first server computer, that the second user computer has been connected to the second server computer; and (g) the first user computer beginning to communicate with the second user computer across the Internet.

According to the second aspect of the present invention, a connection method, in a network system constituted by a plurality of networks each of which includes a plurality of server computers always connected to the networks, for a plurality of user computers as clients of the server computers to connect each other, each of the user computers being capable of connecting to the network system, the method comprises the steps of: (a) a first user computer connecting to a first server computer; (b) the first user computer sending, to the first server computer, a connection request along with ID information for a second user computer; (c) the first server computer, in accordance with the received ID information, locating a second server computer in whose territory the second user computer resides; (d) the first server computer notifying the second server computer of the connection request; (e) the second server computer, in response to the connection request, making a dial-up IP connection to the second user computer; (f) the second server computer notifying the first user computer, via the first server computer, that the second user computer has been connected to the second server computer; and (g) the first user computer beginning to communicate with the second user computer across the Internet.

According to the third aspect of the present invention, a connection method, for connecting user computers, for a network system that includes a large network, which is a conglomeration of a plurality of interconnected small networks worldwide, a plurality of server computers that are always linked together across the large network, and a plurality of user computers that can be connected to the large network as clients of the server computers, comprises the steps of: (a) a first user computer making a dial-up IP connection to a first server computer, (b) the first user computer sending, to the first server computer, a connection request along with ID information for a second user computer; (c) the first server computer, in accordance with the received ID information, locating a second server computer in whose territory the second user computer resides; (d) the first server computer notifying the second server computer of the connection request; (e) the second server computer, in response to the connection request, making a dial-up IP connection to the second user computer; (f) the second server computer noting the first user computer, via the first server computer, that the second user computer has been connected to the second server computer, and (g) the first user computer beginning to communicate with the second user computer across the Internet.

According to the fourth aspect of the present invention, a server computer, which is always connected to the Internet and which is capable of IP connecting a client user computer to the Internet, comprises: (a) means for performing an IP connection when dialed up by a client user computer; (b) means for making a dial-up IP connection to a client user computer in response to a connection request from an another server computer constantly connected; (c) means for receiving a connection request from a client user computer for connection to an another client user computer; (d) a storage area for recording and managing IDs of client user computers, IDs of server computers and current connection states; (e) means for, in response to a connection request from a client user computer, referring to the storage area to search for a corresponding server computer; (f) means for requesting an another server computer, which is constantly connected, make a connection to a requested client user computer; and (g) means for notifying a client user computer that an another server computer has completed an IP connection to an another client user computer.

According to the fifth aspect of the present invention, a server computer, which is always connected to a network system formed by a plurality of networks and which is capable of connecting a client user computer to the network system, comprises: (a) means for, in accordance with a connection request from a client user computer, connecting the client user computer to the network system; (b) means for, in accordance with a connection request from any another server computer always connected, connecting with a requested client user computer; (c) means for receiving from a client user computer a connection request for connection to an another user computer; (d) a storage area for recording and managing IDs of user computers, IDs of server computers and current connection states; (e) means for, in response to a connection request from a client user computer, referring to the storage area to search for a corresponding server computer; (f) means for requesting that an another server computer constantly connected make a connection to a requested client user computer; and (g) means for notifying a client user computer that an another server computer has completed a connection to an another client user computer.

According to the sixth aspect of the present invention, a server computer, which is always connected to a large network that is a conglomeration of a plurality of small networks worldwide and which is capable of connecting a client user computer to the large network, comprises: (a) means for, in accordance with a connection request from a client user computer, connecting the client user computer to the network; (b) means for, in accordance with a connection request from an another server computer always connected, connecting with a requested client user computer; (c) means for receiving from a client user computer a connection request for connection to an another client user computer; (d) a storage area for recording and managing IDs of user computers, IDs of server computers and current connection states; (e) means for, in response to a connection request from a client user computer, referring to the storage area to search for a corresponding server computer; (f) means for requesting to an another server computer that is always connected to make a connection to a requested client user computer; and (g) means for notifying a client user computer that an another server computer has completed a connection to the client user computer.

According to the present invention, when, for example, ordinary Internet user A desires to communicate with user B across the Internet (via an Internet videophone), user A need only dial a server to which user A belongs, Le., server A, which is a server computer at the nearest access point, and issue a request to server A for an IP connection with user B.

Upon receipt of the connection request, server A accesses a storage area that it manages. The storage area can be a storage device for server A or any other server computer on the Internet, e.g., a file server, that is physically independent of the server A. In the storage area are stored, for each user, a record describing the user's name (also called a "host name"), the name of the server to which the user belongs, a phone number for the user, and the current IP connection status of the user. Server A employs a user name of user B among the connection request, and searches for server B and the phone number of user B by referring to the corresponding record, and transfers to server B the connection request.

Since server A and server B, which are server computers on the Internet, are constantly linked to each other, server B can immediately respond to the connection request from server A. It is preferable that both server A and server B be serviced by the same service provider, or that they be server computers serviced by a service provider that provides an interconnection service. Server B refers to the pertinent record in the storage area to determine whether or not user B is currently connected to the Internet. If user B is not connected to the Internet, the server B dials user B to make an IP connection. Server B notifies server A that the IP connection to user B has been completed, and server A notifies user A that the IP connection with user B has been completed.

For user A and user B the IP connection becomes a transparent condition when, for example, the connection is completed in accordance with a protocol in a video conference application program, i.e., when a state exists where the users A and B share an application program with each other, and they can therefore communicate with each other across the Internet (using an Internet videophone connection). No effort is required of user B, such as having to dial up the server in advance for an IP connection and having to wait for the connection request from server A.

The present invention embodies a service provider protocol that provides for a service provider to dial user B on behalf of user A when user A desires to talk with user B via the Internet (using an Internet videophone connection). Ordinary users can easily access each other across the Internet.

According to the present invention, a connection manner of the Internet videophone readily used by an Internet user can be provided.

The other objects, features, and advantages of the present invention will become apparent in due course during the detailed description of the embodiment of the present invention, which will be given while referring to the accompanying drawings.

DESCRIPTION OF THE PREFERRED EMBODIMENT

Figure 1A:
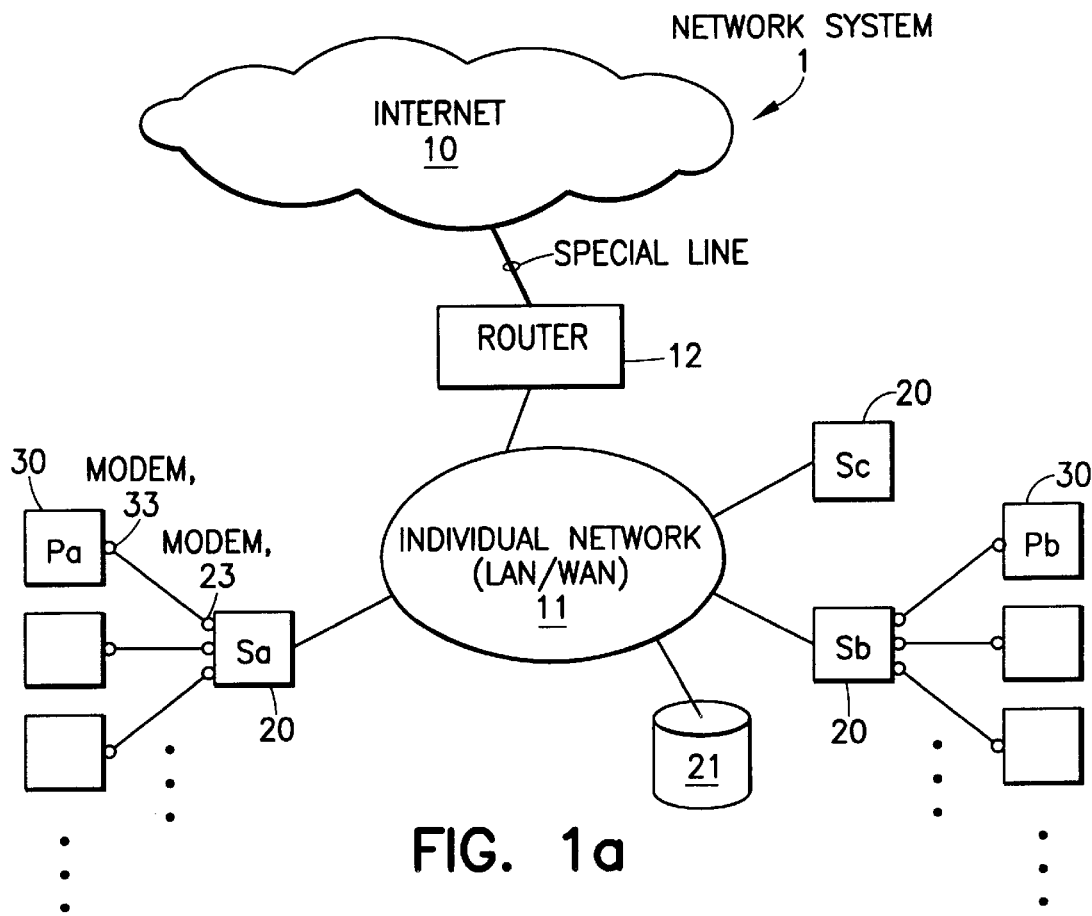
FIGS. 1A and 1B are diagrams illustrating the structure of a typical network system appropriate for embodying the present invention.
Figure 1B:
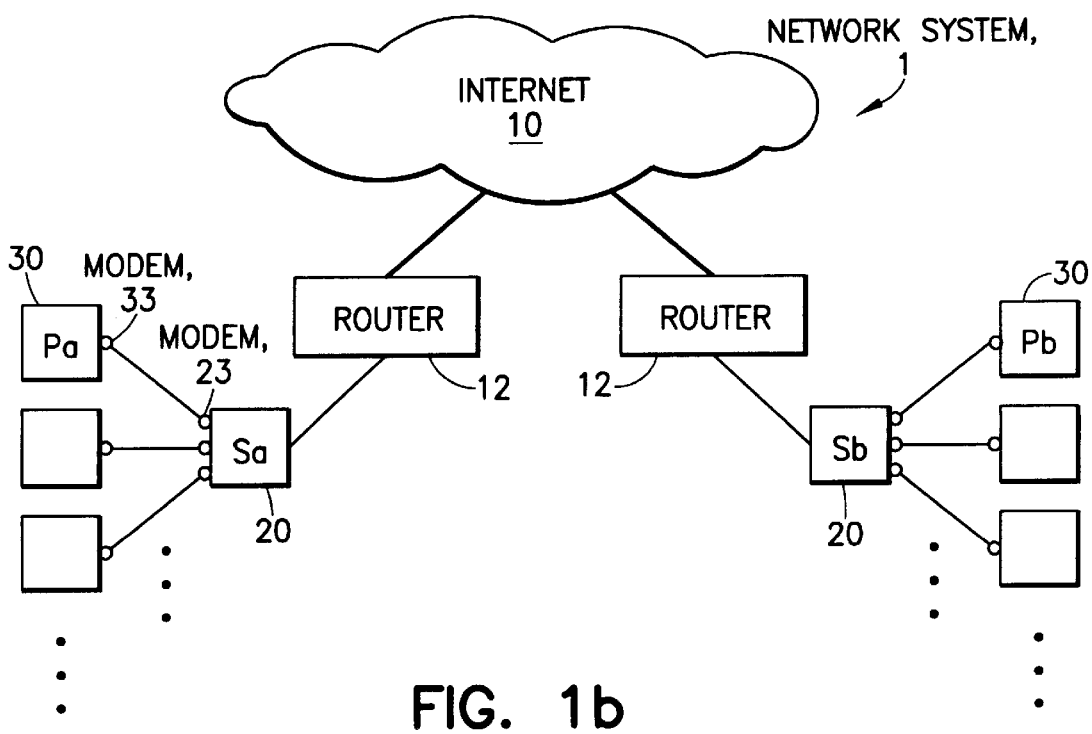

The preferred embodiment of the present invention will now be described in detail while referring to the drawings.
A. System Arrangement Network system:

FIGS. 1A and 1B are diagrams illustrating a typical network system 1 that is appropriate for carrying out the present invention. The network system in this embodiment is assumed to be the Internet.

The network system 1 comprises: the Internet 10 as a large network; a plurality of server computers Sa, Sb, . . . that are always connected to the Internet 10 using an IP connection; and a plurality of user computers Pa, Pb, . . . that are clients of the server computers and that can access the Internet 10 using a dial up IP connection. Hereinafter, two server computers Sa and Sb are assumed to belong to the same service provider.

There are multiple connection forms for connecting the server computer 20 to the Internet 10, and two typical examples are shown. In FIG. 1A, the server computers Sa and Sb, both of which belong to the same service provider, are computer systems connected to a network (LAN or WAN) 11 which is connected to the Internet 10 via a router 12. One example of the network 11 is the "IBM Global Network" presented by IBM Corp. In FIG. 1B, the server computers Sa and Sb are directly connected to the Internet 10 by their own routers.

The Internet 10 is an international network constituted by the interconnection of innumerable remote computer systems (server computers) in accordance with TCP/IP. That is, the Internet 10 is substantially the conglomeration of innumerable computers that store information.

As is described above, the server computers Sa and Sb have a constant IP connection provided by the networks 11 to which they belong or by their own routers. The server computers Sa and Sb have an accessible information storage area. The information storage area may be their own peripheral device (not shown), or a physically independent remote disk or a server computer (e.g., a file server) 21, which the server computers Sa and Sb can access across the network 10 or 11. The information storage area must be accessible by all the server computers that belong to the same service provider. A "client management table", that is shared with the server computers, is saved in the information storage area and will be described later.

The server computers Sa and Sb are high performance PCs or workstations that run a multi-task/multi-user type OS (Operating System) such as "UNIX" or "Windows NT", and have multiple serial ports (multiple serial cards) 22. Each serial port is connected to a modem 23, through which the server computers Sa and Sb can connect with their user computers Pa and Pb across the telephone lines. The server computers Sa and Sb are constantly connected to the Internet 10 by using their own IP addresses, and have multiple other IP addresses. When the client user computers that belong to the server computers Sa or Sb dial up the server computers to request access to the Internet, the server computers Sa or Sb employ the unused IP addressees to provide IP connections for the user computers.

The user computers Pa and Pb may be general-purpose PCs, that are owned by individual users who have executed a contract with the service provider. The user computers Pa and Pb have at least one serial port 32. The serial port 32 is connected to a modem 33, via which the user computer can communicate with another physically independent computer system, e.g., server computer Sa, across the telephone line. It is important for user computers in this embodiment to acquire IP connections to the Internet via the server computers that the user computers belong to, and the connection manner is not limited to dial-up IP connection.

Figure 2:
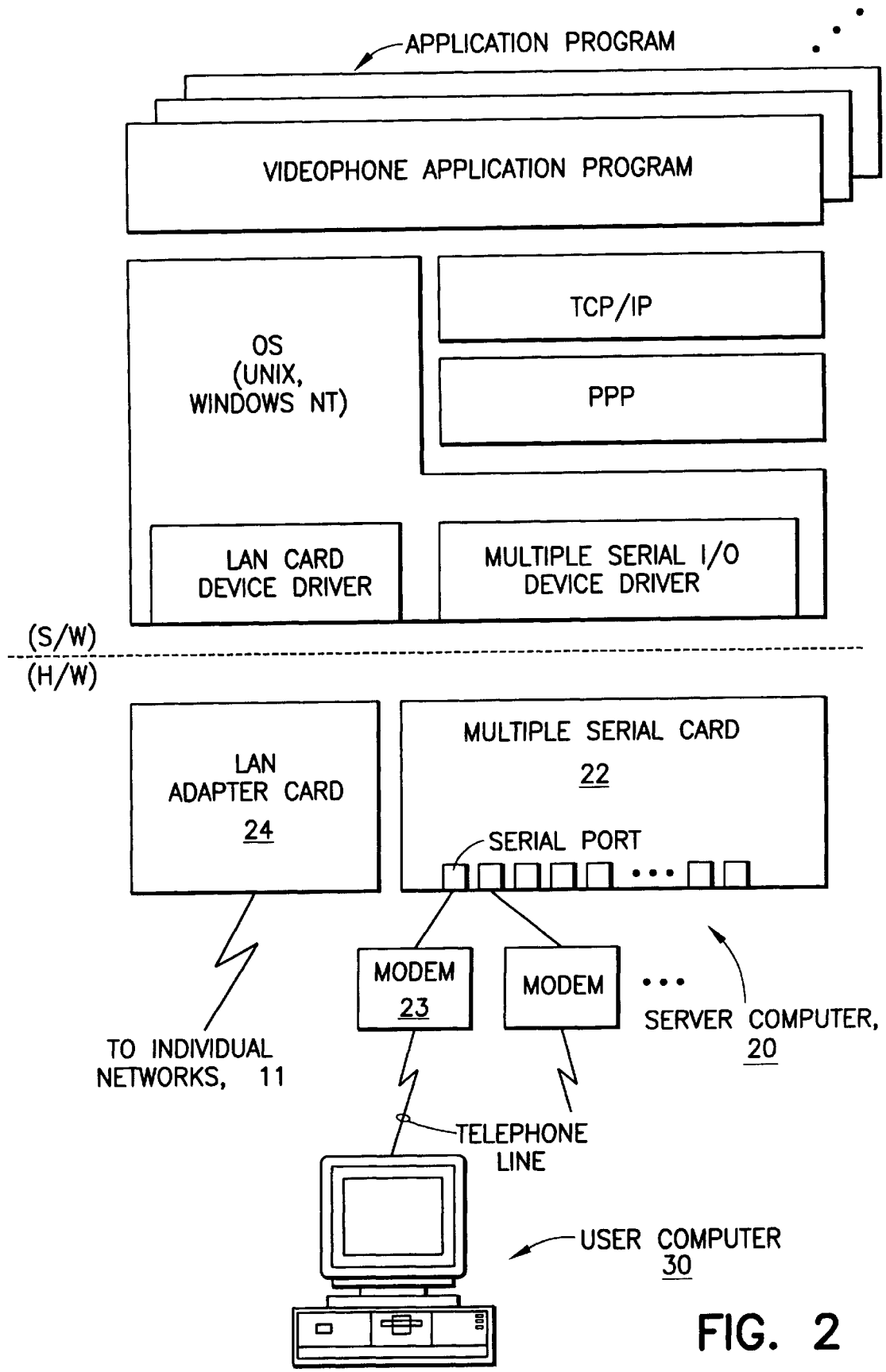
FIG. 2 is a diagram illustrating an example arrangement of a server computer.

Server computer: FIG. 2 is a schematic diagram illustrating the structure of the server computer 20. The server computer 20 is a high performance PC, or a workstation, that runs a multi-task multi-user type OS (Operating System) such as "UNIX" or "Windows NT".

The server computer 20 includes a CPU, a main memory, an input device, a display device and an external storage device (not shown), all of which are appropriate hardware components of an assembly that serves as a high performance PC or a workstation. The server computer 20 in this embodiment further includes the multiple serial card 22 and a LAN adaptor card 24. The multiple serial card 22 is an adaptor card having a plurality of serial ports with which a plurality of modems 23 are connected. The modem 23 is a hardware to employ for data transfer across a telephone line, and modulates digital signals from the computer system and demodulates analog signals received over a telephone line. The LAN adaptor card 24 is employed for data exchange via the LAN, and may be, for example, a "token-ring card" or an "Ethernet card." The server computer 20 is connected to the Internet 10, by using its own IP address, via the network 11 by the LAN adaptor card 22.

The server computer 20 is to be operated under the environment provided by an OS (Operating System) which is the basic software for totally managing the hardware and the software of the server computer 20. The OS is a multi-task type, such as "UNIX" or "Windows NT", as was previously described. The OS includes a "file manager" for managing accesses to a local disk (not shown) of the server computer 20 or to a remote disk (e.g., a local disk of a file server 21) that exists on the network 11 or 10; a "memory manager" for managing data in the main memory; and a "schedular" for managing the execution of a task for the CPU. The OS in this embodiment should further include a "LAN card device driver" (tentative name) for hardware operating the LAN adaptor card 24 that inputs and outputs data across the network 11; and a "multiple serial I/O device driver" (tentative name) for hardware operating the multiple serial card 22 for telecommunication via the modems 23.

Two protocol layers, "PPP (Point to Point Protocol" and "TCP/IP (Transmission Control Protocol/Internet Protocol)", are located above the OS. The PPP is a protocol for one-to-one serial communication with another physically independent computer via the telephone line. The TCP/IP is a protocol for exchanging data via the Internet 10 and has performance for determining communication speeds and transfer packet forms.

The server computer 20 can execute various installed application programs under the OS environment. Especially for the server computer 20 in this embodiment, a "(server) video conference application program" should be installed for linking the user computers across the Internet 10. The server video conference application program has the following functions: (1) The provision of an IP connection to a client user computer of the server computer 20 in response to a dial up by the user computer. (2) The receiving of a request from a client user computer for the connection of another user computer (a requested user computer) across the Internet. (3) The performance of a search for the server computer to which a requested user computer belongs and the transferring of a connection request to the searched server computer. (4) The dialing up of the requested user computer that belongs to that server computer in response to a connection request from another server computer, and the provision of an IP connection to the user computer. (5) The notifying of the requesting server computer that the IP connection to the requested user computer has been completed.

For the server computer 20, a file search/transfer application program (FTP) may additionally be installed.

Figure 3:
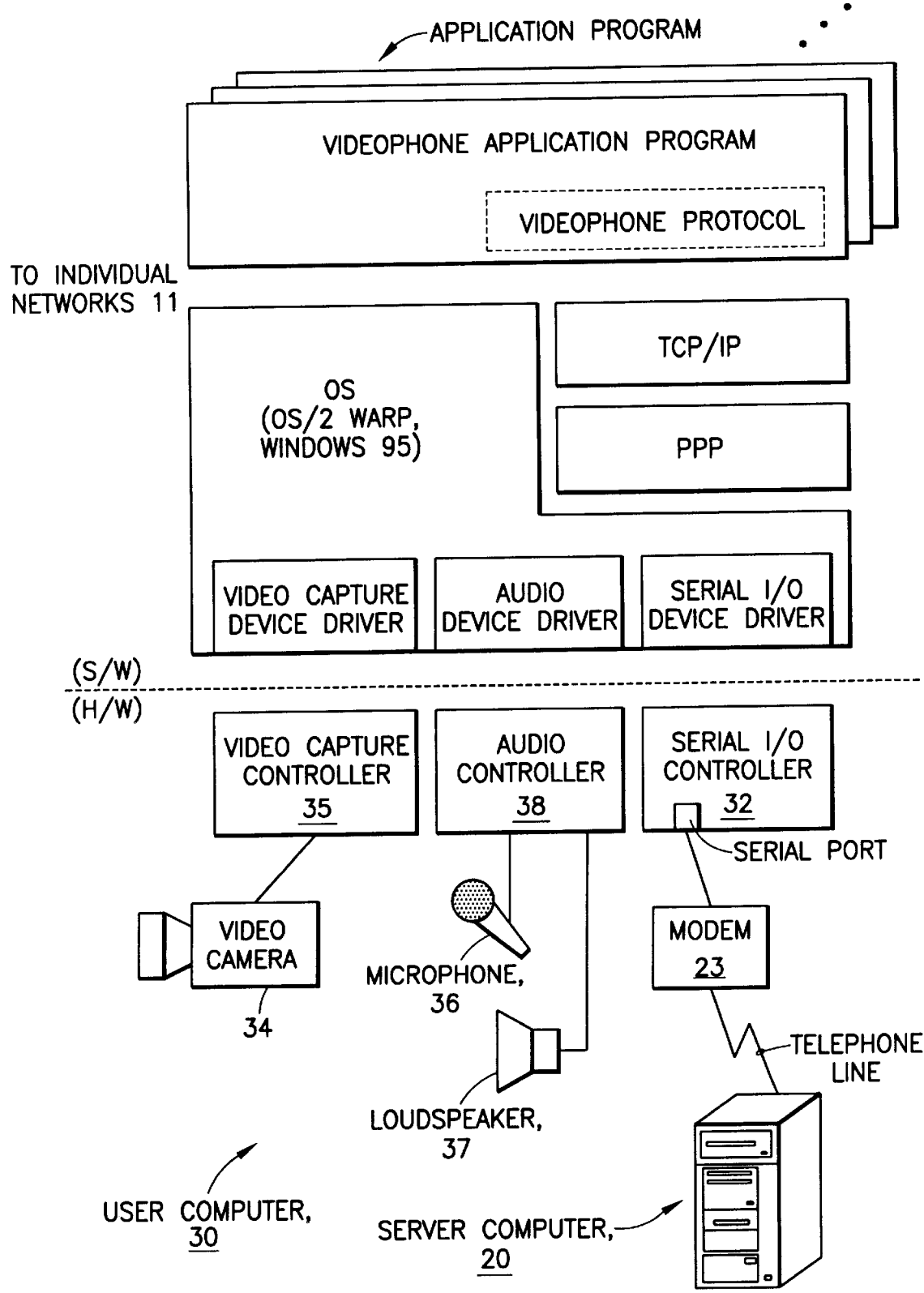
FIG. 3 is a diagram illustrating an example arrangement of a user computer.

User computer: FIG. 3 is a schematic diagram illustrating the structure of the user computer 30. The user computer 30 may be a computer that a user purchases for personal computer communication or for accessing the Internet. A general-purpose PC is satisfactory.

The user computer 30 includes a CPU, a main memory, an input device, a display device and an external storage device (not shown), all of which are proper hardware components for a general-purpose PC. In this embodiment, the user computer 30 should further include a serial I/O controller 32, a video capture controller 35, and an audio controller 38. The serial I/O controller 32 is a dedicated controller for processing serially transferred data, and has a serial port for connecting a modem 33. The video capture controller 35 is a dedicated controller for processing, as computer data, images (video signals) captured by a video camera 34. The audio controller 38 is a special controller for processing audio signals input through a microphone 36 or output through a loudspeaker 37. The video camera 34, the microphone 36 and the loudspeaker 37 are required for the input and output of video/audio data for a video conference.

The user computer 30 is to be operated under the environment provided by an OS (Operating System), which is the basic software for the total management of the hardware and the software of the user computer 30. The OS includes a "file manager" for managing accesses of a local disk (not shown) of the user computer 30, or a remote disk (e.g., a local disk of the file server 21) that exists on the network 11 or 10; a "memory manager" for managing data in the main memory; and a "scheduler" for managing the execution of a task for the CPU. The OS in this embodiment should further include a "serial I/O device driver" (tentative name) for operating the serial I/O controller 32 to perform the serial transfer of data via a serial port; a "video capture device driver" (tentative name) for operating a video capture controller 35 that produces video signals; and an "audio device driver" (tentative name) for operating the audio controller 38 that inputs and outputs audio signals. An expensive, high performance OS, such as "UNIX" or "Windows NT", is not always required for the user computer 30. An OS for personal use, such as "OS/2 Warp" or "Windows 95", is satisfactory.

Two protocol layers, "PPP (Point to Point Protocol" and "TCP/IP (Transmission Control Protocol/Internet Protocol)", are located above the OS. The PPP is a protocol for one-to-one serial communication with another physically independent computer over a telephone line. The TCP/IP is a protocol for exchanging data via the Internet 10.

The user computer 30 can execute various installed application programs within the OS environment. Especially for the user computer 30 in this embodiment, a "(client) video conference application program" should be installed for linking to other user computers across the Internet 10. The client video conference application program has the following functions: (1) The dialing up of a server computer to which the user computer belongs to request an IP connection to the user computer. (2) The issuance of a request to the server computer for a connection with another user computer via the Internet. (3) The communication over the videophone with a user computer with which a connection has been made across the Internet. The video conference application program also has a "videophone protocol" for transparently sharing an application with another user computer. The video conference application program mixes compressed video data or compressed audio data that are input and edited by the system, divides the mixed data into packets, and transfers the packets via the modem 33 over the telephone line. Further, the video conference application program reassembles packets received via the modem 33 to re-constitute the original video data or the original audio data, and outputs these data.

For the user computer 30, a file search/transfer application program (FTP) may additionally be installed.

A computer system that can serve as the server computer 20 or the user computer 30 requires many hardware and software components other than those shown in FIGS. 2 and 3. These components are, however, well known to one having ordinary skill in the art and, as they do not pertain to the subject of the present invention, no explanation for them will be given in the present specifications. The telephone line, that lies between the server computer 20 and the user computers 30, may not be only a conventional public telephone line (POTS) but may also be an ISDN (Integrated Services Digital Network) line.

B. System Operation

In the above sub-division, an explanation has been given for the hardware/software arrangement of the network system 1, the server computer 20 that is constantly connected to the network 10, and the user computer 30 that can be connected to the network 10 by the server computer 20. In this sub division, the operation of the system 1 and the processing of the present invention will be explained while referring to FIGS. 4 through 7. In the following explanation, it is assumed that the two server computers Sa and Sb belong to the same service provider, the user computers Pa and Pb are subscribers of the service provider as clients of the respective server computers Sa and Sb, and the user computer Pa requests a connection to the user computer Pb across the Internet.

Figure 9:
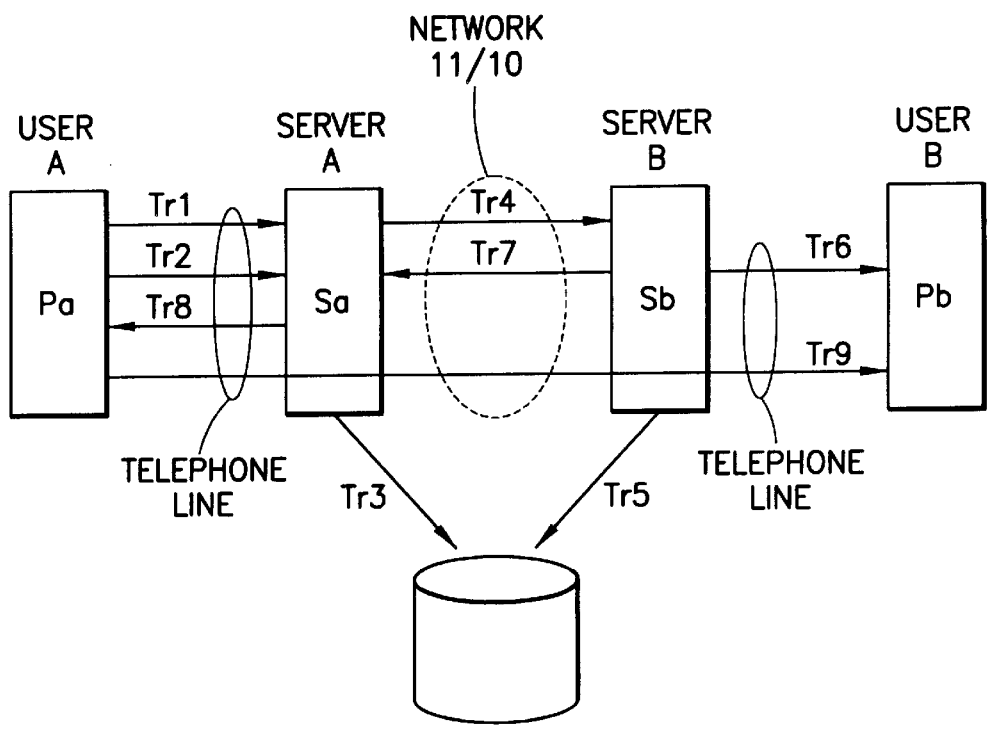
FIG. 9 is a specific diagram illustrating a transaction performed between user computers and server computers.

The connection procedures in this embodiment will now be summarized while referring to FIG. 9. At first, the user computer Pa dials up the server computer Sa to request an IP connection to the Internet (transaction (Tr) 1). Then, the user computer Pa issues to the server computer Sa a connection request to connect with the user computer Pb across the Internet 10 (Tr2). The server computer Sa accesses the file server 21 (or the local disk of the server computer Sa) to search for the server computer Sb to which the user computer Pb belongs (Tr3), and transfers the connection request to the server computer Sb (Tr4). In response to this, the server computer Sb accesses the file server 21 (or the local disk of the server computer Sb) to acknowledge the IP connection state (Tr5). If an IP connection to the user computer Pb has already been effected, the server computer Sb notifies the server computer Sa that the connection has been completed (Tr7). If an IP connection to the user computer Pb has not yet been effected, the server computer Sb dials up the user computer Pb to make an IP connection (Tr6), and then notifies the server computer Sa that the connection has been completed (Tr7). Then the user computer Pa is informed by the server computer Sa that the connection has been completed (Tr8), and when, in response, the user computer Pa communicates with the user computer Pb at the videophone application level, video conferencing is enabled (Tr9).

Figure 4:
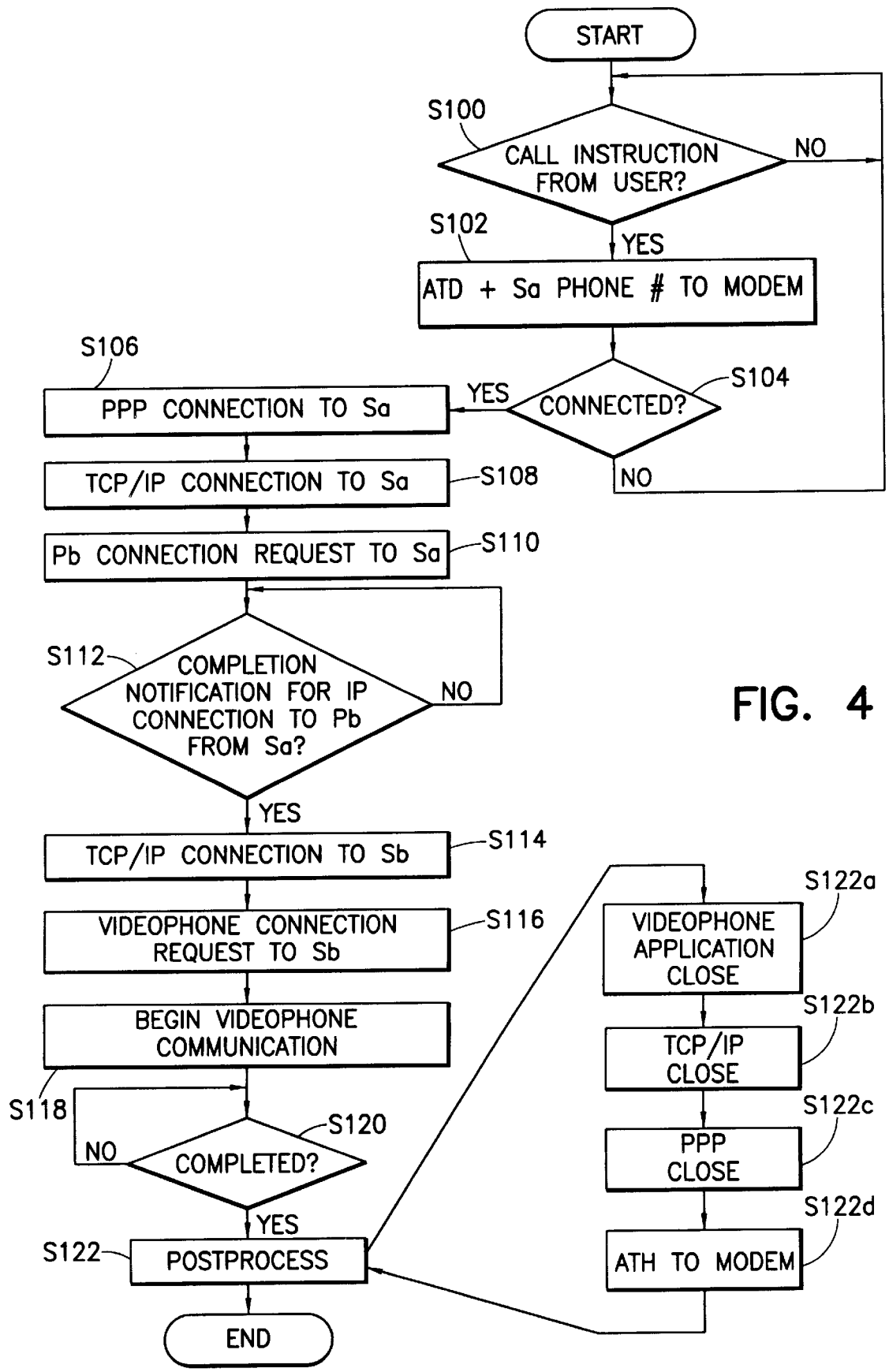
FIG. 4 is a flowchart for the operation of a user computer Pa that is a source of a request for Internet connection.

Operation of User Computer Pa:

FIG. 4 is a flowchart showing the operation of the user computer Pa that is a caller of an Internet video conference. It should be noted that the operation can be performed by the client video conference application program.

When the user computer Pa receives an instruction for a call (i.e., a request for a dial-up IP connection) from a user (step S100), the user computer Pa issues AT command "ATD" to the modem 33 (step S102). The AT command is a modem control command, and ATD is an automatic dialing request to which phone number (Phone#) of the server computer Sa is appended.

Upon receipt of the ATD command, the modem 33 connected to the user computer Pa dials up the server computer Sa. When the modem 23 of the server computer Sa responds to the dial up and answers the call, the modems 23 and 33 are connected at the hardware level (step S104). Then, the connection with the server computer Sa is sequentially performed at the software level in the PPP level and the TCP/IP level order (steps S106 and S108). At this time, an IP connection of the user computer Pa to the Internet 10 is effected.

The user computer Pa sends the user name (also called the "host name") of the user computer Pb, that is a caller, to the server computer Sa to issue a request for connection with the user computer Pb (a connection request across the Internet) (step S110).

The user computer Pa waits until the connection with the user computer Pb has been completed (step S112). During this period, the server computer Sa, the server computer Sb and the user computer Pb perform operations to provide an IP connection to the user computer Pb. A detailed explanation of this will be given later while referring to FIGS. 5 through 7.

When the user computer Pa is informed that an IP connection to the user computer Pb has been effected, the user computer Pa sequentially performs the procedures that are necessary to effect a connection with the user computer Pb at the TCP/IP level and at the video conference application level (steps S114 and S116). The connection at the video conference application level is actually performed by the previously described videophone protocol in the video conference application program.

When the connection at the video conference application level has been completed, the connection across the Internet 10 becomes transparent to the user computers Pa and Pb, i.e., they share their applications with each other. In this condition, the user computers Pa and Pb can freely exchange video/audio data with each other, and can enable a video conference (Internet videophone) (step S118).

When a video conference is to be terminated (step S120), a postprocess is performed (step S122). In the postprocess, the video conference application is closed (step S122a), the line is disconnected at the TCP/IP level (step S122b), disconnected at the PPP level (step S122c), and disconnected at the software level. Finally, AT command "ATH" is sent to the modem 33 to hang it up, and the line is also disconnected at the hardware level (step S122d).

Figure 5:
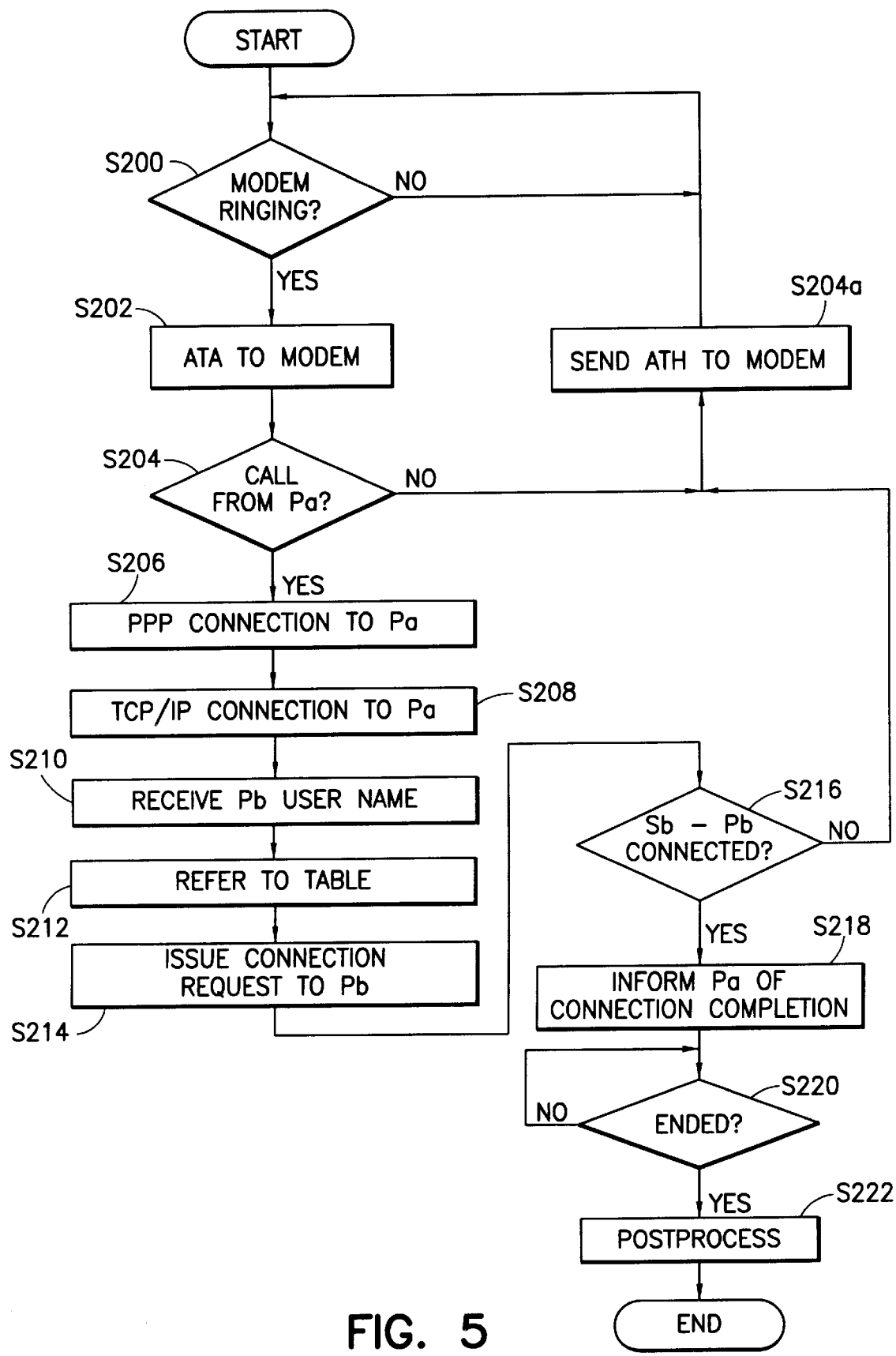
FIG. 5 is a flowchart for the operation of a server computer Sa that manages a user computer, a source of a request for an Internet connection.

Operation of Server Computer Sa:

FIG. 5 is a flowchart showing the operation of the server computer Sa that manages the user computer Pa that is a caller of an Internet video conference. It should be noted that the operation can be performed by the server video conference application program.

When the client user computer Pa dials up the server computer Sa, the modem 23 sends the call (step S200: corresponding to step S102).

In response to this call, the server computer Sa issues AT command "ATA" to the modem 23. ATA means a connection to be made in an answer mode, and the modem 23 receives the call in accordance with this command (step S202).

At step S204, a check is performed to determine whether or not the call was made by the client user computer Pa. When the call is not from the client, e.g., when a wrong number was dialed, the following process, such as an IP connection, is not required. AT command "ATH" is sent to the modem 23 to disconnect the line (step S204a). Program control then returns to the first step.

When the call was made by the client Pa, the server computer Sa connects the line to the user computer Pa, at the software level, in the PPP level (step S206: corresponding to step S106) and the TCP/IP level (step S208: corresponding to step S108) order. The server computer Sa gives one of its unused IP addresses to the user computer Pa, so that an IP connection of the user computer Pa to the Internet 10 is effected.

Figure 8:
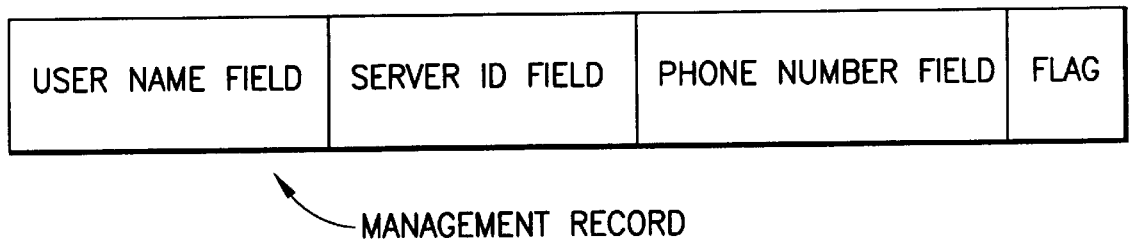
FIG. 8 is a schematic diagram illustrating the structure of a management record in a client management table.

When the server computer Sa receives the user name of the user computer Pb from the user computer Pa (step S210: corresponding to step S110), the server computer Sa examines a "client management table" in its information storage area to find the phone number of the user computer Pb and the server computer Sb managing the user computer Pb. The information storage area may be either a local disk of the server computer Sa or the remote disk (or another server computer) 21 connected via the network 11 or 12, as was previously described. The client management table is used to hold information about all the clients that belong to the service provider. A management record shown in FIG. 8 is prepared for each client. The management record includes a field in which is stored a client user name, a field in which is stored a server ID of the server computer to which the client belongs, a field in which is stored a phone number of the client, and a flag that indicates whether or not the client currently has an IP connection. The flag content is altered as needed when the individual server computer makes an IP connection/disconnection to user computers that belong to itself. The use of the client management table is shared with another server computer Sb that belongs to the same service provider. That is, the server computer Sa can find the server computer Sb and the phone number of the user computer Pb by referring to the management record of the user computer Pb.

The server computer Sa sends, to the server computer Sb, along with the phone number of the user computer Pb, the connection request from the user computer Pa (step S214).

Then, the server computer Sa waits until the server computer Sb completes an IP connection to the user computer Pb (step S216: corresponding to step S112). During this waiting period, the server computer Sb performs a process for the IP connection of the user computer Pb. A detailed explanation of this will be given later while referring to FIGS. 6 and 7. When an IP connection is not made for the user computer Pb within a predetermined period of time, AT command "ATH" is issued and the line is disconnected (step S204a), and an error process is performed.

When the server computer Sa has received a notification from the server computer Sb that the IP connection to the user computer Pb has been made, the server computer Sa relays this notification to the user computer Pa (step S218).

Following this, the user computers Pa and Pb are connected together at the video conference application level, as was previously described, so that the user computers communicate with each other by videophone across the Internet 10 (step S220: corresponding steps S118 through S120).

To terminate the video conference between the user computers, the server computer Sa performs an end process in advance (step S222). The contents of this process is substantially the same as that at step S122.

Figure 6:
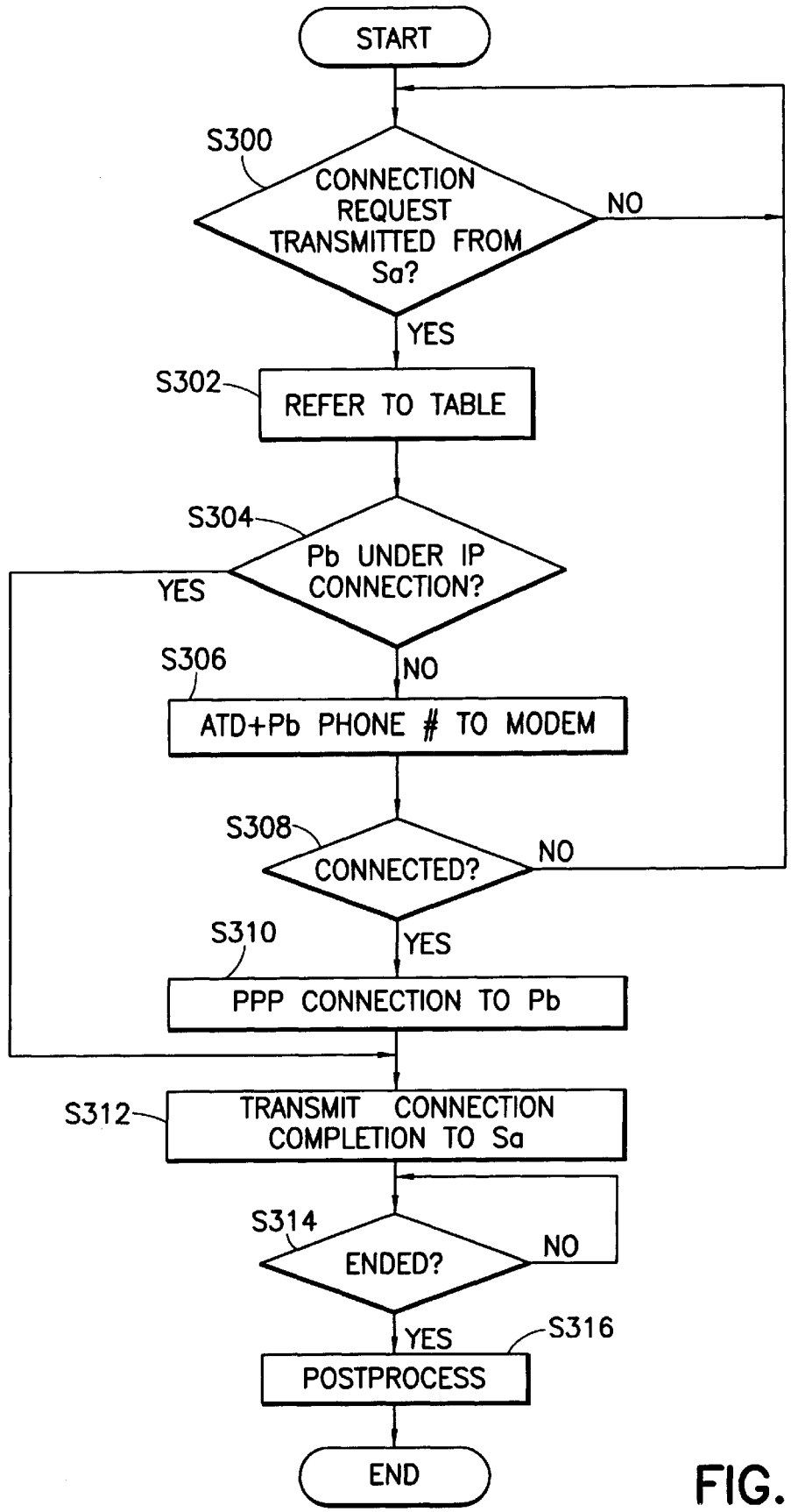
FIG. 6 is a flowchart for the operation of a server computer Sb that manages a user computer that has requested an Internet connection.

Operation of server computer Sb: FIG. 6 is a flowchart showing the operation of the server computer Sb to which the user computer Pb, that is a caller of an Internet video conference, belongs. It should be noted that the operation can be performed by the server video conference application program.

When the server computer Sb has received a connection request to connect with the user computer Pb, which is managed by the server computer Sb, from the server computer Sa that belongs to the same service provider (step S300: corresponding to steps S110 and S214), the server computer Sb refers to the client management table in the information storage area (step S302). The use of the "client management table" is shared with the server computer Sa, as was previously described.

The server computer Sb examines the condition of the flag in the management record of the user computer Pb to determine whether or not the user computer Pb currently has an IP connection (step S304). If an IP connection has been made for the user computer Pb, the IP connection process is not required for the user computer Pb. Program control, therefore, skips steps S306, S308 and S310, and at step S312 the server computer Sb notifies the server computer Sa that the IP connection is completed.

If IP connection of the user computer Pb has not yet been made, the server computer Sb, first, issues AT command "ATD" to the modem 23, and dials up the user computer Pb (step S306). When the server computer Sb is connected to the user computer Pb via the modem and at the PPP level (steps S308 and S310), program control advances to step S312 where at the server computer Sb notifies the server computer Sa of the completion of the IP connection. The user computer Pb need be connected only at the TCP/IP level to the user computer Pa, which is a communication partner across the Internet. Therefore, a TCP/IP connection between the server computer Sb and the user computer Pa is not performed.

A notification that an IP connection to the user computer Pb has been completed is sent to the user computer Pa via the server computer Sa (step S218). The user computers Pa and Pb are connected together at the TCP/IP level and at the video conference application level (steps S114 and S116). As a result, both user computers can conduct video conferencing (Internet videophone) (step S314: corresponding to steps S118 and S120).

Thereafter, the server computer Sb performs an end process in advance when the video conferencing between the user computers is terminated (step S316). The end process is substantially the same as step S122.

Figure 7:
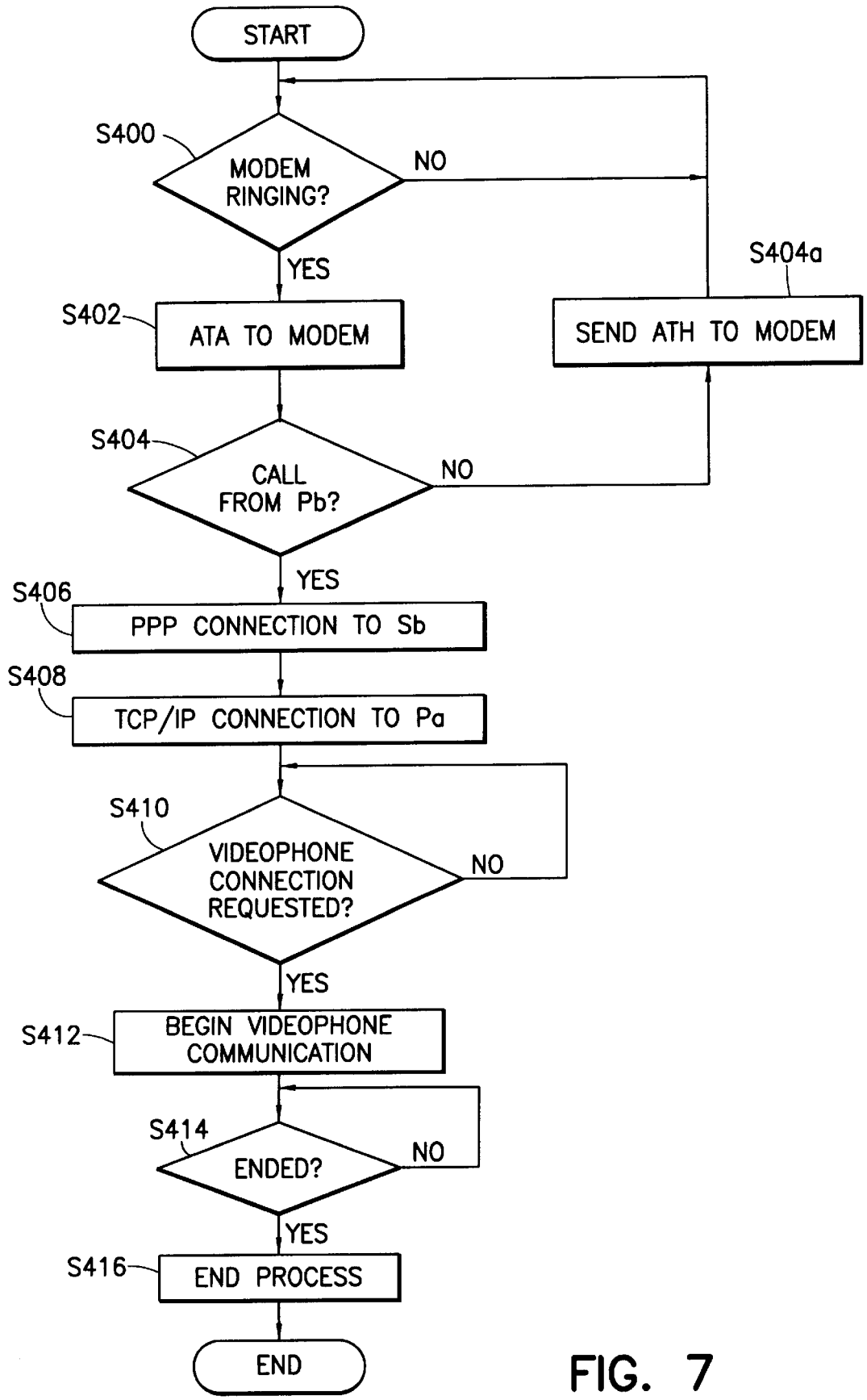
FIG. 7 is a flowchart for the operation of a user computer Pb that has requested an Internet connection.

Operation of User Computer Pb:

FIG. 7 is a flowchart showing the operation of the user computer Pb that is a recipient of an Internet video conference. It should be noted that the operation can be performed by the client video conference application program.

When the server computer Sb, for which the user computer Pb is a client subscriber, dials up the user computer Pb, the modem 33 sends the call (step S400: corresponding to step S306).

In response to this call, the user computer Pb issues AT command "ATA" to the modem 33, and receives the call (step S402).

At step S404, a check is performed to determine whether or not the call was made by the server computer Sb for which the user computer Pb is a subscriber. When the call is not from the server computer Sb, e.g., a wrong number was dialed, the following process, such as IP connection, is not required. AT command "ATH" is sent to the modem 33 to disconnect the line (step S404a). Program control then returns to the first step.

When the call is sent from the server computer Sb, the user computer Pb is connected to the server computer Sb at the PPP level (step S406: corresponding to step S310). Then, the TCP/IP connection is made between the user computer Pb and the user computer Pa, which has received a notification that the IP connection has been completed (step S408: corresponding to S114). As a result, the user computers Pa and Pb are mutually connected across the Internet 10.

When a request for videophone connection is sent from the server computer Sa (step S410: corresponding to step S116), the user computers Pa and Pb are connected at the videophone protocol level. As a result, the connection becomes transparent to the user computers Pa and Pb, i.e., both of the user computers share the use of application. Under these circumstances, the user computers Pa and Pb can freely exchange video/audio data, and video conferencing (Internet videophone) can be enabled (steps S412 and S414: corresponding to step S118).

The server computer Sb performs an end process in advance to terminate a video conference between the user computers (step S416). The end process is substantially the same as step S122.

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the claims should be referred to.

As is described above in detail, according to the present invention, provided is an excellent connection method, for a network system (e.g., the Internet), for connecting user computers that can access a network as clients of a server computer, and an excellent server computer.

Further, according to the present invention, when ordinary user A desires to talk to ordinary user B, a service provider protocol that provides an intermediate service provider to call user B for user A is employed to ensure the usability of an Internet phone (videophone).

In addition, according to the present invention, provided is a type of connection to an Internet videophone that is convenient for Internet users.

Having thus described our invention, what we claim as new and desire to secure by Letters Patent is:

1. A connection method, for a network system that encompasses the Internet, a plurality of user computers, and a plurality of server computers, said server computers being constantly interconnected to provide said user computers an IP, Internet Protocol, connection service for the Internet, comprising the steps of:

a. a first user computer making a dial-up IP connection to a first server computer;

b. said first user computer sending, to said first server computer, a connection request along with ID information for a second user computer;

c. said first server computer, in accordance with said received ID information, locating a second server computer in whose territory said second user computer resides;

d. said first server computer notifying said second server computer of said connection request;

e. said second server computer, in response to said connection request, making a dial-up IP connection to said second user computer;

f. said second server computer notifying said first user computer, via said first server computer, that said second user computer has been connected to said second server computer; and g. said first user computer beginning to communicate with said second user computer across the Internet.

2. In a network system, said system including a plurality of networks, each of said networks including a plurality of server computers which are always connected to said networks, a connection method for a plurality of user computers as clients of said server computers to connect each other, each of said user computers being capable of connecting to said network system, said method comprising the steps of:

a. a first user computer connecting to a first server computer;

b. said first user computer sending, to said first server computer, a connection request along with ID information for a second user computer;

c. said first server computer, in accordance with said received ID information, locating a second server computer in whose territory said second user computer resides;

d. said first server computer notifying said second server computer of said connection request;

e. said second server computer, in response to said connection request, making a dial-up IP, Internet Protocol, connection to said second user computer;

f. said second server computer notifying said first user computer, via said first server computer, that said second user computer has been connected to said second server computer; and g. said first user computer beginning to communicate with said second user computer across the Internet.

3. A connection method, for connecting user computers, for a network system that includes a large network, which is a conglomeration of a plurality of interconnected small networks worldwide, a plurality of server computers that are always linked together across said large network, and a plurality of user computers that can be connected to said large network as clients of said server computers, comprising the steps of:

a. first user computer making a dial-up IP, Internet Protocol, connection to a first server computer;

b. said first user computer sending, to said first server computer, a connection request along with ID information for a second user computer;

c. said first server computer, in accordance with said received ID information, locating a second server computer in whose territory said second user computer resides;

d. said first server computer notifying said second server computer of said connection request;

e. said second server computer, in response to said connection request, making a dial-up IP connection to said second user computer;

f. said second server computer notifying said first user computer, via said first server computer, that said second user computer has been connected to said second server computer; and g. said first user computer beginning to communicate with said second user computer across the Internet.

4. A server computer, which is always connected to the Internet and which is capable of IP, Internet Protocol, connecting a client user computer to the Internet, comprising:

a. means for performing an IP connection when dialed up by a client user computer;

b. means for making a dial-up IP connection to a client user computer in response to a connection request from an another server computer constantly connected;

c. means for receiving a connection request from a client user computer for connection to an another client user computer;

d. a storage area for recording and managing IDs of client user computers, IDs of server computers and current connection states;

e. means for, in response to a connection request from a client user computer, referring to said storage area to search for a corresponding server computer;

f. means for requesting an another server computer, which is constantly connected, make a connection to a requested client user computer; and g. means for notifying a client user computer that an another server computer has completed an IP connection to an another client user computer.

5. A server computer, which is always connected to a network system formed by a plurality of networks and which is capable of connecting a client user computer to said network system, comprising:

a. means for, in accordance with a connection request from a client user computer, connecting the client user computer to said network system;

b. means for, in accordance with a connection request from another server computer always connected, connecting with a requested client user computer;

c. means for receiving from a client user computer a connection request for connection to another user computer;

d. a storage area for recording and managing IDs of user computers, IDs of server computers and current connection states;

e. means for, in response to a connection request from a client user computer, referring to said storage area to search for a corresponding server computer;

f. means for requesting that another server computer constantly connected make a connection to a requested client user computer; and g. means for notifying a client user computer that another server computer has completed a connection to another client user computer.

6. A server computer, which is always connected to a large network that is a conglomeration of a plurality of small networks worldwide and which is capable of connecting a client user computer to said large network, comprising:

a. means for, in accordance with a connection request from a client user computer, connecting the client user computer to said network;

b. means for, in accordance with a connection request from another server computer always connected, connecting with a requested client user computer;

c. means for receiving from a client user computer a connection request for connection to another client user computer;

d. a storage area for recording and managing IDs of user computers, IDs of server computers and current connection states;

e. means for, in response to a connection request from a client user computer, referring to said storage area to search for a corresponding server computer;

f. means for requesting to another server computer that is always connected to make a connection to a requested client user computer; and g. means for notifying a client user computer that another server computer has completed a connection to said client user computer.

\* \* \* \* \*